United States Patent [19]

Lindner

[11] Patent Number: 5,361,865
[45] Date of Patent: Nov. 8, 1994

[54] MOTOR VEHICLE HAVING EQUIPMENT PARTS IN THE FRONT OCCUPANT AREA WHICH CAN BE ADJUSTED ON SEPARATE SIDES

[75] Inventor: Thomas Lindner, Munich, Germany

[73] Assignee: Bayerische Motoren Werke AG, Germany

[21] Appl. No.: 99,481

[22] Filed: Jul. 27, 1993

[30] Foreign Application Priority Data

Jul. 28, 1992 [DE] Germany ............................. 4224864

[51] Int. Cl.$^5$ ......................... B60H 1/00; B60K 28/04
[52] U.S. Cl. ..................................... 180/273; 165/22; 165/43; 237/2 A; 454/75
[58] Field of Search .................... 180/273; 280/735; 165/22, 42, 43; 237/2 A; 454/75

[56] References Cited

U.S. PATENT DOCUMENTS 4,364,513 12/1982 Tsuzuki et al. .................... 165/43
4,537,245 8/1985 Nishimura et al. ................ 165/43
4,759,269 7/1988 Brown et al. ...................... 165/22
4,881,456 11/1989 Yasuda et al. ..................... 165/22
5,161,820 11/1992 Vollmer ............................. 180/273

Primary Examiner—Brian L. Johnson
Assistant Examiner—Peter C. English
Attorney, Agent, or Firm—Evenson, McKeown, Edwards & Lenahan

[57] ABSTRACT

In a motor vehicle having equipment parts in the front-occupant area which can be adjusted on separate sides, two operating modes are possible. In a conventional operating mode, the adjusting of the equipment parts on the front passenger's side takes place individually corresponding to the front passenger's presettings. In the other operating mode, the adjusting of the equipment parts on the front passenger's side takes place synchronously with the adjustment of the equipment parts on the driver's side corresponding to the driver's presettings. The selection of the two operating modes takes place automatically or arbitrarily.

10 Claims, 1 Drawing Sheet

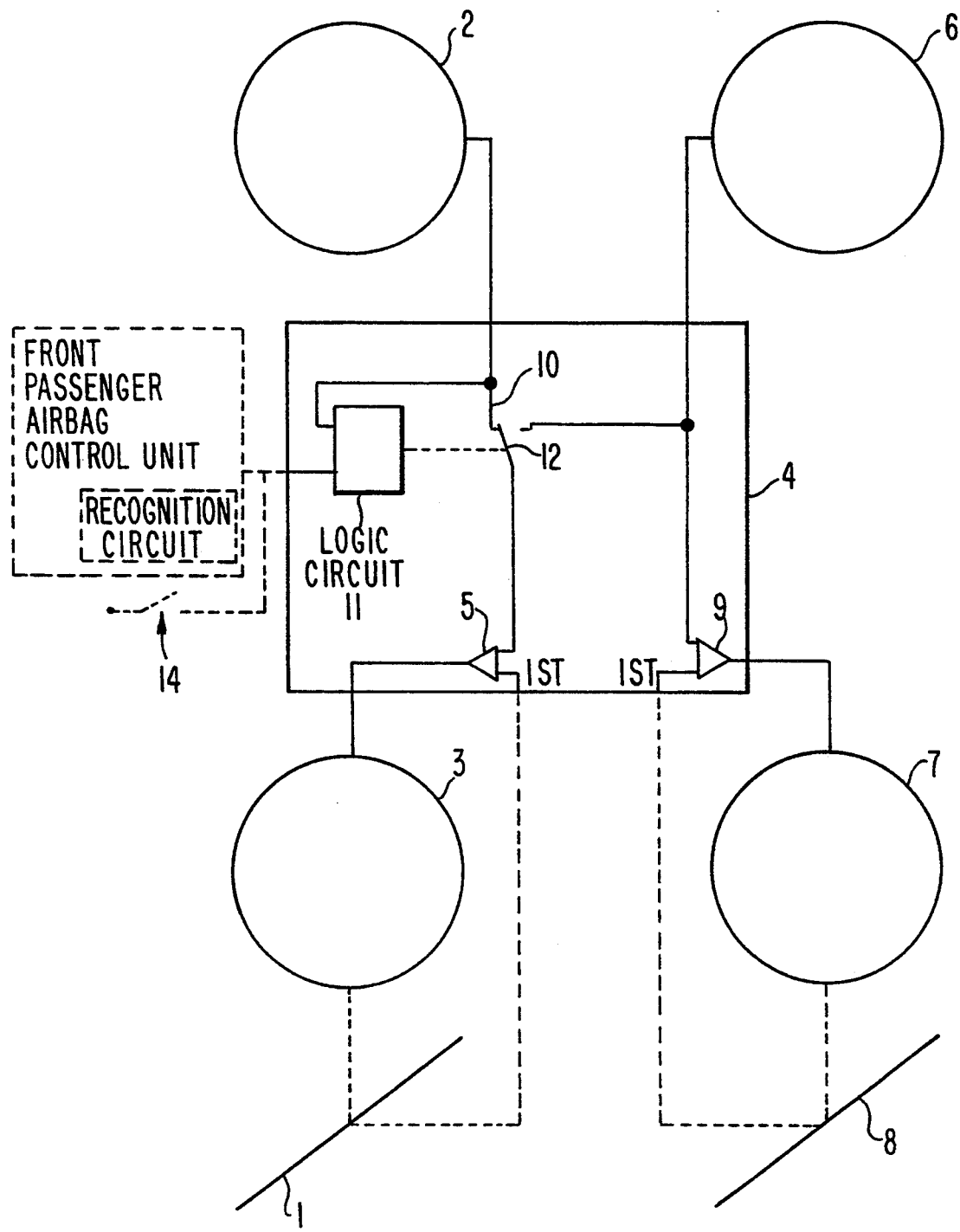

MOTOR VEHICLE HAVING EQUIPMENT PARTS IN THE FRONT OCCUPANT AREA WHICH CAN BE ADJUSTED ON SEPARATE SIDES

BACKGROUND AND SUMMARY OF THE INVENTION

This invention relates to a motor vehicle having equipment parts in the front occupant area which can be adjusted on separate sides of the vehicle.

Such equipment parts as described above mainly are control elements for a heating and/or air-conditioning system. It is used, for example, to adjust the temperature and the air distribution on the front passenger's side independently of the adjustment on the driver's side. In addition, these equipment parts may also be control elements for a communication system, such as a radio, by means of which the loudness can be adjusted on the front passenger's side independently of that on the driver's side. Although, these equipment parts clearly increase the comfort in comparison to conventional equipment parts which cannot be adjusted on separate sides, there is the disadvantage that, when the front passenger's seat is not occupied, the equipment parts cannot be reached or can only be reached with difficulty by the driver. It will then be required to repeat any change of the adjustment on the front passenger's side, which presents a considerable distraction and difficulty. The gain in comfort when the front passenger's seat is occupied is virtually cancelled by the loss in comfort when the front passenger's seat is unoccupied.

An object of the present invention is to provide a motor vehicle of the initially mentioned type, in which, while the possibility of an adjustment of the equipment parts on separate sides is maintained, a comfortable adjusting possibility is also provided when the front passenger's seat is unoccupied.

This and other objects are achieved by the present invention which provides a method of operating a motor vehicle having equipment parts in the front area which are separately adjustable on a driver side and a front passenger side of the motor vehicle, and comprises entering an operating mode in which the equipment parts on the front passenger side are adjustable synchronously with a corresponding adjustment on the driver side.

The objects are also achieved by the present invention which provides a motor vehicle having equipment parts in the front area which are separately adjustable on a driver side and on a front passenger side of the motor vehicle in a first operating mode, and comprises a device, coupled to the equipment parts, which is operable in a second operating mode in which adjustment of the equipment parts on the front passenger side is synchronous with a corresponding adjustment on the driver side.

The present invention allows for an adjustment of the equipment parts on the driver's side and on the front passenger's side that is separate on each side and is also synchronous. The first possibility (separate on each side) will exist when the front passenger's seat is occupied. The front passenger can then adjust the passenger's equipment parts individually. If, in contrast, the front passenger's seat is not occupied, the operating mode according to the invention may be selected by which it is possible for the driver to adjust the equipment parts on the front passenger's side corresponding to the adjustment of the driver's equipment parts. The change-over between the operating mode that is separate on each side and that is synchronous may take place arbitrarily. Switches or other controls are used for this purpose which are to be operated arbitrarily by the front passenger or the driver.

However, in addition and irrespective of the above, it is also possible to carry out the selection of the operating mode automatically. Thus, it is possible, for example, to provide a synchronizing operation between the driver's and the front passenger's side when the operation of the motor vehicle is started. When one of the equipment parts on the front passenger's side is adjusted arbitrarily and independently of the corresponding equipment part on the driver's side, this can automatically cancel the synchronization and a change-over can take place to the operating mode of the individual adjustment of the equipment parts on the front passenger's side. Because of the individual adjustment of the equipment parts on the front passenger's side, it can therefore be recognized that the front passenger's seat is occupied.

However, the fact that the front passenger's seat is occupied may also be recognized directly by means of a suitable sensing mechanism, such as a pressure switch in the front passenger's seat or a proximity sensor directed at the front passenger's seat. In this case, when the front passenger's seat is occupied, it is possible to always preset the operating mode of the adjustment that is separate on each side.

Finally, the operating mode can also be triggered by means of a control unit by which a front passenger's air bag can be activated. Such a control unit determines whether the front passenger's seat is occupied and will activate the air bag only when this is necessary because the front passenger's seat is occupied. Within the scope of this invention, the output signal of this control unit may be used for the automatic selection of the operating mode.

Other objects, advantages and novel features of the present invention will become apparent from the following detailed description of the invention when considered in conjunction with the accompanying drawings.

BRIEF DESCRIPTION OF THE DRAWINGS

The single figure shows the basic construction of an equipment part of a motor vehicle which is used on the front passenger's side and whose method of operation can be selected.

DETAILED DESCRIPTION OF THE DRAWINGS

An equipment part 1 in the form of an air control flap is illustrated schematically and is used, for example, for controlling the air distribution on the front passenger's side. For this purpose, a control element 2 is provided which may, for example, be a rotating actuator and which furnishes a set value for the desired adjustment. Via a drive 3, such as a direct-current motor, the control element 2 acts upon the equipment part 1. Between the control element 2 and the drive 3, a control unit 4 is situated which compares the set value supplied by the control element 2 with the momentary actual value of the equipment part 1. In the case of a difference between the set value and the actual value, the equipment part will be controlled via the drive 3 until the difference is zero. For this purpose, a variance comparator 5 which controls the drive 3 is provided inside the control unit 4.

A corresponding arrangement comprising a control element 6 and a drive 7 for an equipment part 8 is provided for the driver's side. Equipment part 8, for example, controls the air distribution on the driver's side as a function of the desired value set by the control element and the respective actual value as well as by means of a comparator 9 analogous to comparator 5.

The above described elements are conventional for motor vehicles and permits a first operating mode in which an adjustment of the equipment parts 1 and 8 on separate sides takes place by the presetting of individual desired values by means of the control elements 2 and 6. This operating mode makes sense and will be provided when the front passenger seat is occupied.

In contrast, when the front passenger seat is empty, another operation mode is adjusted automatically with the present invention. For this purpose, a desired-value change-over switch 10 is provided in the control unit 4 and is controlled by logic circuit 11. The logic circuit 11 receives an input signal of a recognition circuit for determining whether the front passenger's seat is occupied. The recognition circuit can be part of a control unit by means of which the triggering of a front passenger's air bag is prevented when the front passenger seat is not occupied. When the front passenger seat is not occupied, the logic circuit 11 causes a change-over switch element 12 of the desired-value change-over switch 10 to move from the illustrated position into its other position in which the desired value change-over switch 10 connects the control element 6 (the driver's control element) with the comparators 5 and 9. The two comparators 5 and 9 will then synchronously control the two drives 3 and 7 and thus the equipment parts 1 and 8.

When the front passenger seat is occupied, the change-over switch 12 is switched back into the indicated position. The drives 3 and 7 are then adjusted independently of one another corresponding to the presetting by the control elements 2 and 6.

In addition to the equipment parts 1 and 8 illustrated in the example, additional equipment parts, such as flaps, throttles and valves for a heating and air-conditioning unit which are not shown may also be controlled by the control unit 4 via assigned drives.

As a supplement or an alternative to the illustrated automatic setting of the synchronous adjustment of the equipment parts 1 and 8 or of the adjustment of the equipment parts 1 and 8 that is separate on the two sides, it is possible to also select this adjustment arbitrarily. For this purpose, a push-button switch 14 (shown in phantom) may, for example, be provided to supply a signal to the logic circuit 11 corresponding to the signal of the recognition circuit. Upon a switching command of the push button switch 14, the change-over switch element 12 is brought into the respective other position. As a result, the switch-over between the two operating modes may take place arbitrarily.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A motor vehicle comprising:
   equipment parts in a front occupant area which are separately adjustable on a driver side and on a front passenger side of the motor vehicle;
   a control unit coupled to the equipment parts, which is operable in a first operating mode in which the equipment parts are separately adjustable and in a second operating mode in which adjustment of the equipment parts on the front passenger side is synchronous with a corresponding adjustment on the driver side, wherein the control unit includes a logic circuit coupled to receive from a signal source at least one input signal that determines the operating mode, and a desired value change-over switch coupled between the logic circuit and the equipment parts and controlled by the logic circuit between two positions such that in a first of the positions, the equipment parts are separately adjustable at the driver side and at the front passenger side, and in a second of the positions, the equipment parts are synchronously adjustable at the driver side.

2. A motor vehicle according to claim 1, further comprising an arbitrarily selectable first switch coupled to the control unit and which provides said input signal to the logic circuit which causes the logic circuit to select the second operating mode.

3. A motor vehicle according to claim 2, further comprising a circuit coupled to the control unit and which provides said input signal to the logic circuit which causes the logic circuit to automatically select the second operating mode.

4. A motor vehicle according to claim 3, wherein the circuit includes means for recognizing when a front passenger seat is occupied, the means for recognizing generating said input signal.

5. A motor vehicle according to claim 4, wherein the means for recognizing is coupled to a control unit that controls activation of a front passenger air bag.

6. A motor vehicle according to claim 1, further comprising a circuit coupled to the control unit and which provides said input signal to the logic circuit which causes the logic circuit to automatically select the second operating mode.

7. A motor vehicle comprising:
   equipment parts in front occupant area which are separately adjustable on a driver side and on a front passenger side of the motor vehicle;
   a control unit coupled to the equipment parts, said control unit being operable in a first operating mode in which the equipment parts are separately adjustable and in a second operating mode in which adjustment of the equipment parts on the front passenger side is synchronous with a corresponding adjustment on the driver side, wherein the control unit includes a logic circuit coupled to receive from a signal source an input signal that is indicative of occupancy of the front passenger side, wherein the operating mode of the control unit is automatically determined by the logic circuit in dependence on the input signal such that occupancy of the front passenger side causes the logic circuit to place the control unit in the first operating mode, and no occupancy of the front passenger side causes the logic circuit to place the control unit in the second operating mode, and a switch coupled between the logic circuit and the equipment parts for controlling the equipment parts to be separately adjustable or synchronously adjustable in dependence on the determination by the logic circuit.

8. A motor vehicle according to claim 7, further comprising an arbitrarily selectable first switch coupled to the control unit and which provides a second input signal to the logic circuit which causes the logic circuit to select the second operating mode.

9. A motor vehicle according to claim 8, wherein the signal source is a means for recognizing when a front passenger seat is occupied, the means for recognizing generating said input signal.

10. A motor vehicle according to claim 9, wherein the means for recognizing is coupled to a control unit that controls activation of a front passenger air bag.

* * * * *